(12) United States Patent
Kim et al.

(10) Patent No.: US 7,466,387 B2
(45) Date of Patent: Dec. 16, 2008

(54) INTEGRATED CIRCUIT AND DISPLAY DEVICE INCLUDING INTEGRATED CIRCUIT

(75) Inventors: Sang-Soo Kim, Seoul (KR); Seung-Hwan Moon, Kyungki-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 159 days.

(21) Appl. No.: 10/638,272

(22) Filed: Aug. 7, 2003

(65) Prior Publication Data

US 2004/0135956 A1    Jul. 15, 2004

(30) Foreign Application Priority Data

Aug. 7, 2002    (KR) .................... 10-2002-0046508

(51) Int. Cl.
 *G02F 1/1345* (2006.01)
(52) U.S. Cl. .................... 349/149; 345/77; 345/87
(58) Field of Classification Search .............. 349/149; 345/89; 438/30; 257/30, 59, 72
See application file for complete search history.

(56) References Cited

U.S. PATENT DOCUMENTS

| | | | |
|---|---|---|---|
| 5,499,131 A | | 3/1996 | Kim |
| 5,757,450 A | | 5/1998 | Fujii et al. |
| 6,104,465 A | * | 8/2000 | Na et al. .................... 349/152 |
| 6,532,055 B2 | * | 3/2003 | Oishi .................... 349/149 |
| 6,618,111 B1 | * | 9/2003 | Nagata et al. .................... 349/149 |
| 2001/0020995 A1 | * | 9/2001 | Kim .................... 349/149 |
| 2003/0117566 A1 | * | 6/2003 | Park .................... 349/149 |

FOREIGN PATENT DOCUMENTS

| | | |
|---|---|---|
| JP | 06-148669 | 5/1994 |
| JP | 08248430 | 9/1996 |
| JP | 09-211479 | 8/1997 |
| JP | 09-329797 | 12/1997 |
| JP | 10-010550 | 1/1998 |
| JP | 10-062805 | 3/1998 |
| JP | 10-133218 | 5/1998 |
| JP | 10-142623 | 5/1998 |
| JP | 10-153791 | 6/1998 |
| JP | 10-282516 | 10/1998 |
| JP | 10-339880 | 12/1998 |
| JP | 11-038429 | 2/1999 |
| JP | 11-149087 | 6/1999 |

(Continued)

OTHER PUBLICATIONS

English Language Abstract, KR Patent Publication No. 1997-048819, Jul. 29, 1997, 1 page.

(Continued)

*Primary Examiner*—Richard H Kim
(74) *Attorney, Agent, or Firm*—MacPherson Kwok Chen & Heid LLP

(57) ABSTRACT

A display device includes a plurality of signal lines having different length, and a driving circuit for supplying signals to the signal lines. Each signal line includes a connecting portion, and the driving circuit includes a plurality of output terminals electrically connected to the connecting portions of the signal lines and a plurality of resistors connected to the output terminals. The resistors have resistance depending on length of the signal lines connected thereto.

19 Claims, 9 Drawing Sheets

FOREIGN PATENT DOCUMENTS

| | | |
|---|---|---|
| JP | 2000-019549 | 1/2000 |
| JP | 2000019549 | 1/2000 |
| JP | 2000-081634 | 3/2000 |
| JP | 2000-111939 | 4/2000 |
| JP | 2000-162628 | 6/2000 |
| JP | 2000227584 | 8/2000 |
| JP | 2000-321589 | 11/2000 |
| JP | 2001-264799 | 9/2001 |
| KR | 1997-048819 | 7/1997 |
| KR | 1019970048819 | 7/1997 |
| KR | 1998-031762 | 7/1998 |
| KR | 1020020030699 | 4/2002 |

OTHER PUBLICATIONS

English Language Abstract, KR Patent Publication No. 1998-031762, Jul. 25, 1998, 1 page.
English Language Abstract, JP Patent Publication No. 06-148669, May 27, 1994, 1 page.
English Language Abstract, JP Patent Publication No. 09-211479, Aug. 15, 1997, 1 page.
English Language Abstract, JP Patent Publication No. 09-329797, Dec. 22, 1997, 1 page.
English Language Abstract, JP Patent Publication No. 10-010550, Jan. 16, 1998, 1 page.
English Language Abstract, JP Patent Publication No. 10-062805, Mar. 6, 1998, 1 page.
English Language Abstract, JP Patent Publication No. 10-133218, May 22, 1998, 1 page.
English Language Abstract, JP Patent Publication No. 10-142623, May 29, 1998, 1 page.
English Language Abstract, JP Patent Publication No. 10-153791, Jun. 9, 1998, 1 page.
English Language Abstract, JP Patent Publication No. 10-282516, Oct. 23, 1998, 1 page.
English Language Abstract, JP Patent Publication No. 10-339880, Dec. 22, 1998, 1 page.
English Language Abstract, JP Patent Publication No. 11-038429, Feb. 12, 1999, 1 page.
English Language Abstract, JP Patent Publication No. 11-149087, Jun. 2, 1999, 1 page.
English Language Abstract, JP Patent Publication No. 2000-019549, Jan. 21, 2000, 1 page.
English Language Abstract, JP Patent Publication No. 2000-081634, Mar. 21, 2000, 1 page.
English Language Abstract, JP Patent Publication No. 2000-111939, Apr. 21, 2000, 1 page.
English Language Abstract, JP Patent Publication No. 2000-162628, Jun. 16, 2000, 1 page.
English Language Abstract, JP Patent Publication No. 2000-321589, Nov. 24, 2000, 1 page.
English Language Abstract, JP Patent Publication No. 2001-264799, Sep. 26, 2001, 1 page.
Office Action dated Apr. 6, 2007 from Chinese Patent Application corresponding to U.S. Patent Application 6,104,465 and English Translation.
English Abstract, Publication No. KR1020020030699.
English Abstract, Publication No. JP08248430.
English Abstract, Publication No. JP2000227584.
English Abstract, Publication No. JP2000019549.
English Abstract, Publication No. KR1019970048819.

* cited by examiner

INTEGRATED CIRCUIT AND DISPLAY DEVICE INCLUDING INTEGRATED CIRCUIT

BACKGROUND OF THE INVENTION (a) Field of the Invention

The present invention relates to an integrated circuit and a display device including an integrated circuit, in particularly to a display device including a plurality of lines having different resistances.

(b) Description of Related Art

A display device such as a liquid crystal display (LCD) or an organic electroluminescence (EL) display includes a plurality of pixels as basic elements for displaying an image. Each pixel includes a switching element for independent operation.

The switching elements include a tri-terminal element including a control terminal, an input terminal, and an output terminal, which is turned on or off in response to a signal applied to the control terminal and selectively transmits a signal entering into the input terminal via the output terminal. For this purpose, a plurality of signal lines for applying the signals to the control terminals and the input terminals of the switching elements and a plurality of driving circuits for supplying the signals to the signal lines are provided at a display device.

The TFT array panel includes a plurality of scanning signal lines or gate lines for transmitting scanning signals, a plurality of image signal lines or data lines for transmitting image signals, a plurality of TFTs connected to the gate lines and the data lines, a plurality of pixel electrodes connected to the TFTs, a gate insulating layer covering the gate lines for insulation, and a passivation layer covering the TFTs and the data lines for insulation.

The TFT includes a gate electrode, which is a part of the gate line, a semiconductor layer for a channel, source and drain electrode, which are parts of the data line, a gate insulating layer, and a passivation layer. The TFT is a switching element for transmitting or blocking the image signal from the data line to the pixel electrode in response to the scanning signal from the gate line.

The driving circuits are located near edges of the display device and connected to end portions of the signal lines, which are clustered in a small area (referred to as "connection area" hereinafter) for the connection. On the contrary, the distances between the signal lines in an area (referred to as "display area") including the pixels have a value determined by the size of the pixels to have larger values than the distances between their end portions connected to the driving circuits. Accordingly, a plurality of fan-out areas in which the distances between the signal lines gradually increase or decrease like a fan are provided between the connection area and the display area.

Although the signal lines near the center of the fan-out area extend straight without curving, the signal lines closer to edges of the fan-out area have larger curving angles. The configuration of the fan-out area results in the difference in the length between the signal lines such that the line length near the center of the fan-out area is shorter than the line length near the edges of the fan-out area. The length difference differentiates the resistances of the signal lines, which results in the deteriorated image quality.

In particular, since a liquid crystal display uses a voltage control scheme which controls voltages applied to the pixels, the voltage difference due to the resistance difference causes a severe problem in image quality.

SUMMARY OF THE INVENTION

A motivation of the present invention is to reduce resistance difference of a display device.

A display device is provided, which includes: a plurality of signal lines having different length, each signal line including a connecting portion; and a driving circuit for supplying signals to the signal lines, the driving circuit including a plurality of output terminals electrically connected to the connecting portions of the signal lines and a plurality of resistors connected to the output terminals. The resistors have resistance depending on length of the signal lines connected thereto.

Preferably, the resistance of the resistors connected to relatively long signal lines is relatively small, and the sum of the resistance of the resistors and the resistance of the signals lines connected thereto is substantially uniform.

The signal lines are preferably arranged like a fan near the connecting portions, and the resistance of the resistor closer to edges of the driving circuit is preferably larger.

At least one of the signal lines may have curves near the connecting portions.

The driving circuit may be chip-mounted on the display device. The display device may further include a printed circuit mounting the driving circuit and including a plurality of conductive lines for electrical connection between the driving circuit and an external device. The conductive lines are connected to the connecting portions of the signal lines.

The driving circuit may further include a buffer for temporarily storing output voltages, and the resistors are connected between the buffer and the output terminals.

A liquid crystal display is provided, which includes: a plurality of gate lines for transmitting first signals, each gate line including a connecting portion; a plurality of data lines for transmitting second signals, each data line including a connecting portion; a plurality of switching elements connected to the gate lines and the data lines and selectively transmitting the second signals in response to the first signals; a gate driving circuit for supplying the first signals to the gate lines and including a plurality of output terminals connected to the connecting portions of the gate lines; and a data driving circuit for supplying the second signals to the data lines and including a plurality of output terminals connected to the connecting portions of the data lines, wherein at least one of the gate driving circuit and the data driving circuit includes a plurality of resistors connected to the output terminals thereof, and the resistance of the resistors depends on length of the gate lines or the data lines connected thereto.

Preferably, the resistance of the resistors connected to relatively gate line or data line is relatively small, and the sum of the resistance of the resistors and the resistance of the gate lines or the data lines connected thereto is substantially uniform.

The liquid crystal display may further include: a plurality of contact assistants contacting the connecting portions of the gate lines or the data lines; and a printed circuit including a film mounting the at least one of the gate driving circuit and the data driving circuit and a plurality of leads connected to the output terminals of the at least one of the gate driving circuit and the data driving circuit, wherein the contact assistants contact the leads.

At least one of the gate lines or the data lines may have curves near the connecting portions.

A driving circuit for a liquid crystal display is provided, which includes: a circuit element for generating driving signals; a plurality of output terminals electrically connected to the circuit element and outputting the driving signals; and a plurality of resistors connected between the circuit element and the output terminals, wherein the resistance of the resistors increases or decreases depending on the output terminals connected thereto.

The resistance of the resistors closer to a center of the driving circuit is preferably larger.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF PREFERRED EMBODIMENTS

Figure 1:
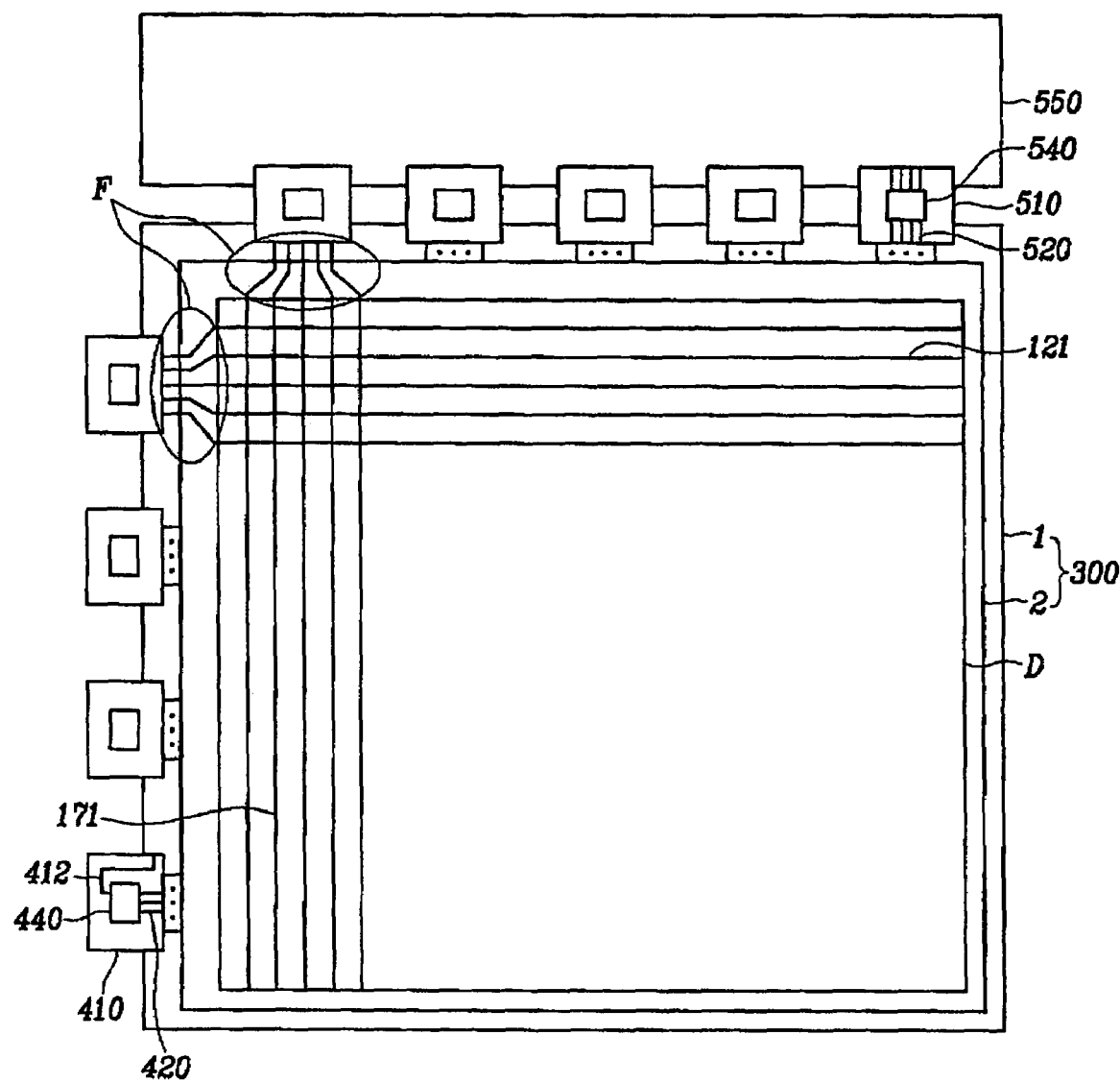
FIG. 1 is a schematic layout view of an LCD according to an embodiment of the present invention.

The present invention now will be described more fully hereinafter with reference to the accompanying drawings, in which preferred embodiments of the present invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region, panel or substrate is referred to as being "on" another element, it can be directly on the other element or intervening elements may also be present. In contrast, when an element is referred to as being "directly on" another element, there are no intervening elements present.

Now, integrated circuits and display devices according to embodiments of the present invention will be described in detail with reference to the drawings.

Figure 2:
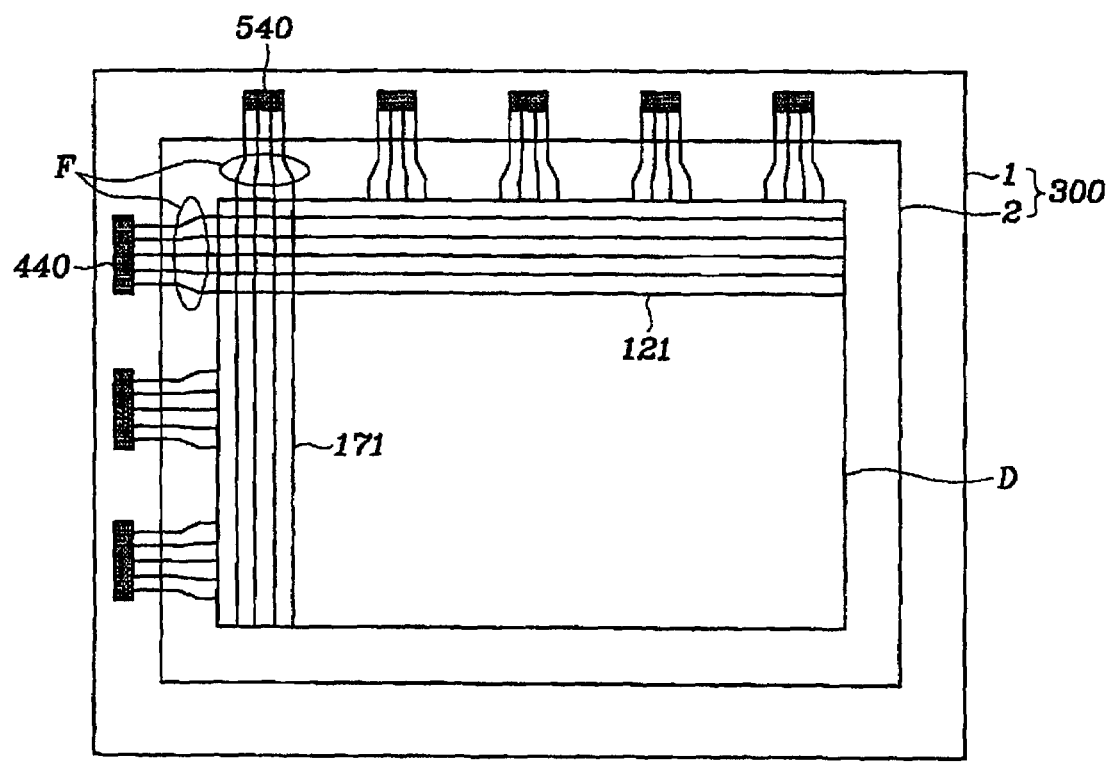
FIG. 2 is a schematic layout view of an LCD according to another embodiment of the present invention.
Figure 3:
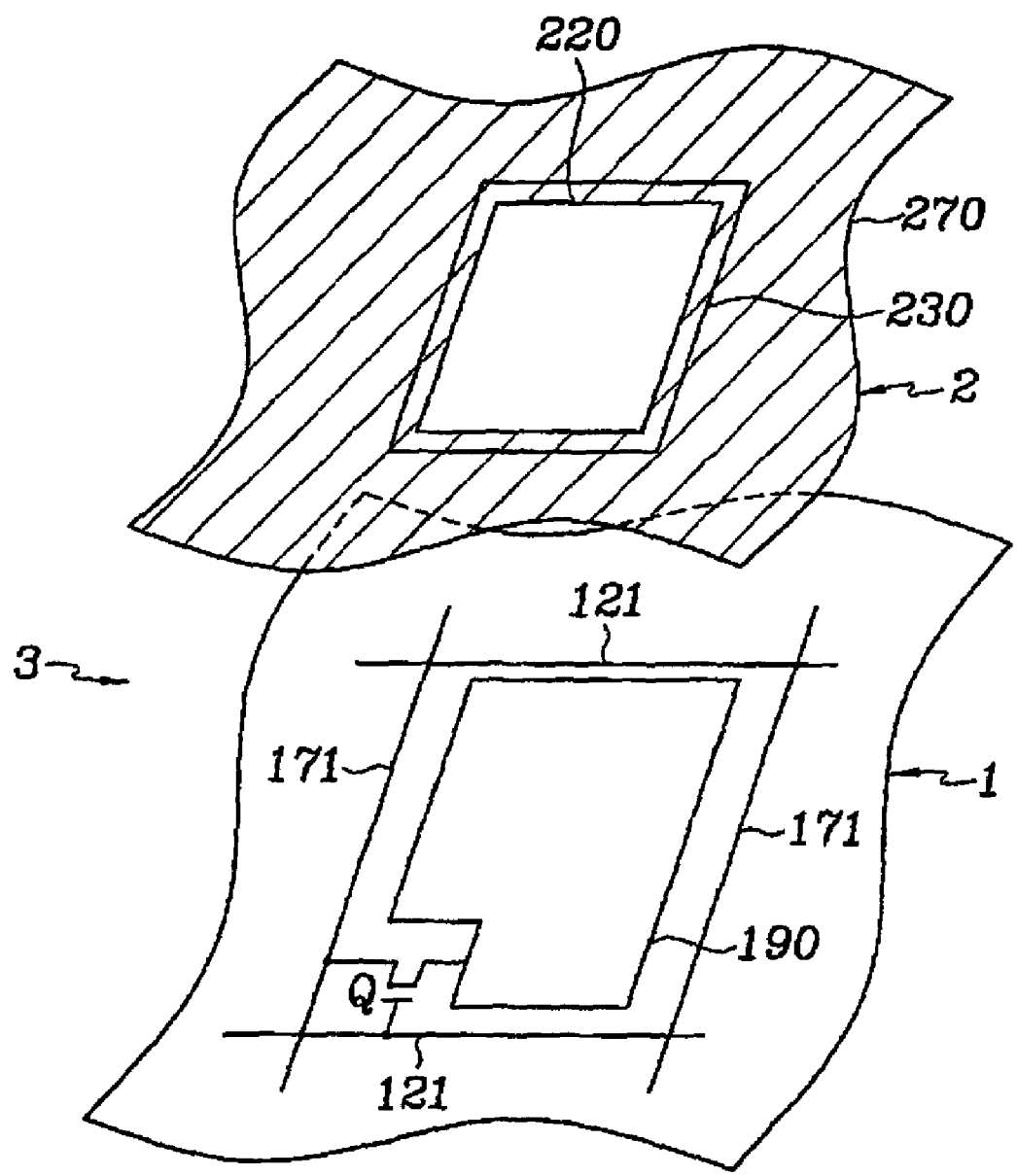
FIG. 3 is a schematic perspective view of an LCD according to another embodiment of the present invention.

FIG. 1 is a schematic layout view of an LCD according to an embodiment of the present invention, FIG. 2 is a schematic layout view of an LCD according to another embodiment of the present invention, and FIG. 3 is a schematic perspective view of an LCD according to another embodiment of the present invention.

Referring to FIG. 1, an LCD according to an embodiment of the present invention includes a liquid crystal panel assembly 300, a plurality of gate flexible printed circuit (FPC) films 410 and a plurality of data FPC films 510 attached to the panel assembly 300, and a printed circuit board (PCB) 550 attached to the data FPC film 510.

Referring to FIG. 3, the panel assembly 300 includes a lower panel 1 and an upper panel 2 facing each other and a liquid crystal layer 3 interposed between the two panels 1 and 2.

The upper panel 2 includes a black matrix 220 having a plurality of apertures arranged in a matrix, a plurality of primary color filters 230 such as red, green, and blue color filters disposed in respective apertures in the black matrix 220, and a common electrode 270 formed on an entire surface of the upper panel. These elements such as the black matrix 220, the color filters 230, and the common electrode 270 may be provided on the lower panel 1.

The lower panel 1 includes a plurality of pixel electrodes 190 arranged in a matrix, a plurality of switching elements Q connected to the pixel electrodes 190, a plurality of gate lines 121 connected to the switching elements Q and transmitting gate signals (also referred to as "scanning signals"), and a plurality of data lines 171 connected to the switching elements Q and transmitting data signals.

The pixel electrodes 190 face the apertures of the black matrix 220 and are preferably made of a transparent conductive material such as indium tin oxide (ITO) and indium zinc oxide (IZO) or of a reflective metal.

The switching elements Q include three-terminal thin film transistors (TFTs), each switching element Q having control and input terminals respectively connected to the gate line 121 and the data line 171 and an output terminal connected to the pixel electrode 190 such that the switching element Q selectively transmits the data signals from the data lines 171 responsive to the gate signals from the gate lines 121.

Referring back to FIG. 1, a plurality of gate driver integrated circuits (ICs) 440 and a plurality of data driver ICs 540 are chip-mounted on the gate FPC films 410 and the data FPC films 510, respectively. A plurality of leads 420 and 520 for electrical connection to an external device are formed on the FPC films 410 and 510, respectively.

Various circuit elements for driving and controlling the panel assembly 300 are provided on the PCB 550. The circuit elements are connected to the data driver ICs 540 via signal lines (not shown) provided on the PCB 550 and the leads 520 on the data FPC films 510. The electrical connection between the gate driver ICs 440 and the PCB 550 is made by signal lines (not shown) separately provided on the data PCB 550 and the lower panel 1 and the leads 420 on the gate FPC films 410.

Another embodiment shown in FIG. 2 mounts the driver ICs 440 and 540 directly on the lower panel 1 of the panel assembly 300, and the gate FPC film is not required. The PCB 550 and the data FPC film 510 are not shown in FIG. 2 for descriptive convenience.

According to another embodiment, an additional PCB (not shown) is attached to the gate FPC films 410, and some circuit elements of the PCB 550 are provided on the additional PCB.

According to an embodiment of the present invention, the driver ICs 440 and/or 540 are integrated into the lower panel 1, instead of being chip-mounted.

The packaging type shown in FIG. 1, which mounts the driving ICs 440 and 540 on separate films, is tape carrier package (TCP) or chip-on-film (COF) package, while the packaging type shown in FIG. 2, which mounts the driving ICs 440 and 540 directly on the panel 1, is chip-on-glass (COG) package.

Referring to FIGS. 1 and 2, the lower panel 1 is divided into a display area D including the array of the pixel electrodes 190, and a peripheral area located outside the display area D and including the connections between the display signal lines 121 and 171 and the FPC films 410 and 510 (as shown in FIG. 1) or the driving ICs 440 and 540 (as shown in FIG. 2).

The display signal lines 121 or 171 are connected to the pixel electrodes 190 through the switching elements Q in the display area and extend substantially parallel to each other. The signal lines 121 and 171 have one ends located in the peripheral area and connected to the FPC films 410 and 510 or the driver ICs 440 and 540. An area where the signal lines 121 and 171 are directly connected to the FPC films 410 and 510 or the driver ICs 440 and 540 is called "a pad area."

As shown in FIG. 1, the distance between the leads 420 of the FPC films 410 and 510 for the connection between the driver ICs 440 and 540 and the display signal lines 121 and 171 is smaller than the distance between the signal lines 121 or 171 in the display area D. Similarly, the distance between output terminals of the driver ICs 440 and 540 to be connected to the display signal lines 121 and 171 is smaller, as shown in FIG. 2, than the distance between the signal lines 121 or 171 in the display area D. Accordingly, there are a plurality of fan-out areas where the distance between the signal lines 121 or 171 varies such that the signal lines 121 or 171 are arranged like a fan.

Accordingly, the signal lines 121 and 171 located near the center of the fan-out areas are the shortest, and their length becomes longer as they go to edges of the fan-out areas, as shown in FIGS. 1 and 2. As a result, the signal lines 121 and 171 located near the center of the fan-out areas have the smallest resistance, and their resistance becomes larger as they go to edges of the fan-out areas. In order to reduce the resistance deviation, embodiments of the present invention provide resistors at output terminals of the driving ICs 440 and 540. The resistance of the resistors of the output terminals increases as the respective signal lines 121 and 171 to be connected to the output terminals becomes longer, and in particular, the resistance of a resistor is inversely proportional to the length of the signal line to be connected thereto.

Now, driving ICs according to embodiments of the present invention are described in detail with reference to FIGS. 4-7.

Figure 4:
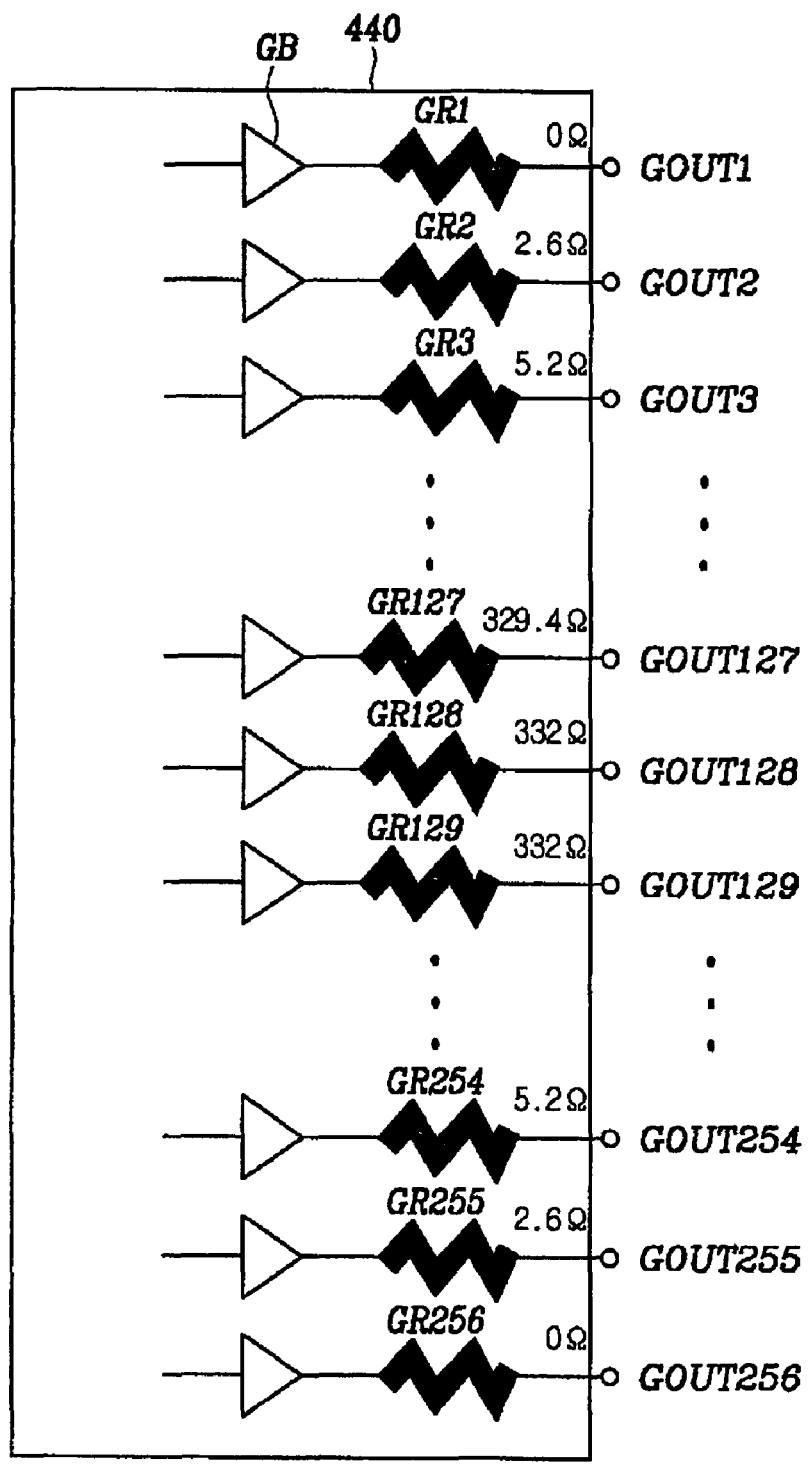
FIG. 4 is a circuit diagram schematically showing a gate driving IC of an LCD according to an embodiment of the present invention.
Figure 5:
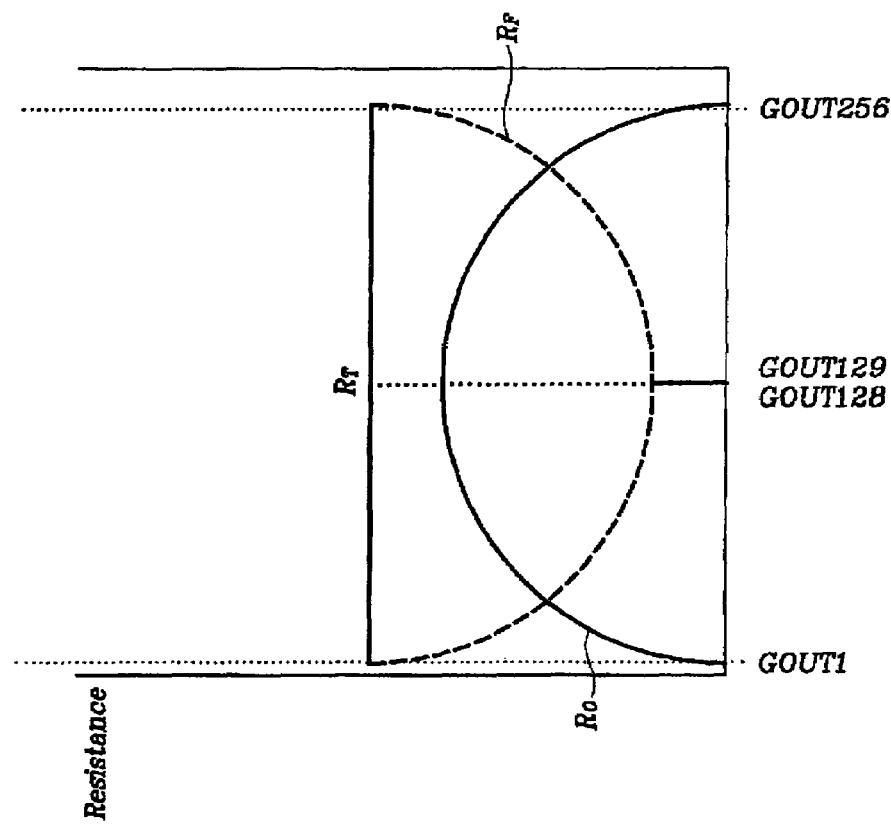
FIG. 5 is a graph showing the resistance of output terminals of the gate driving IC shown in FIG. 4 and the resistance of gate lines in a fan-out area of an LCD including the gate driving IC shown in FIG. 4.
Figure 6:
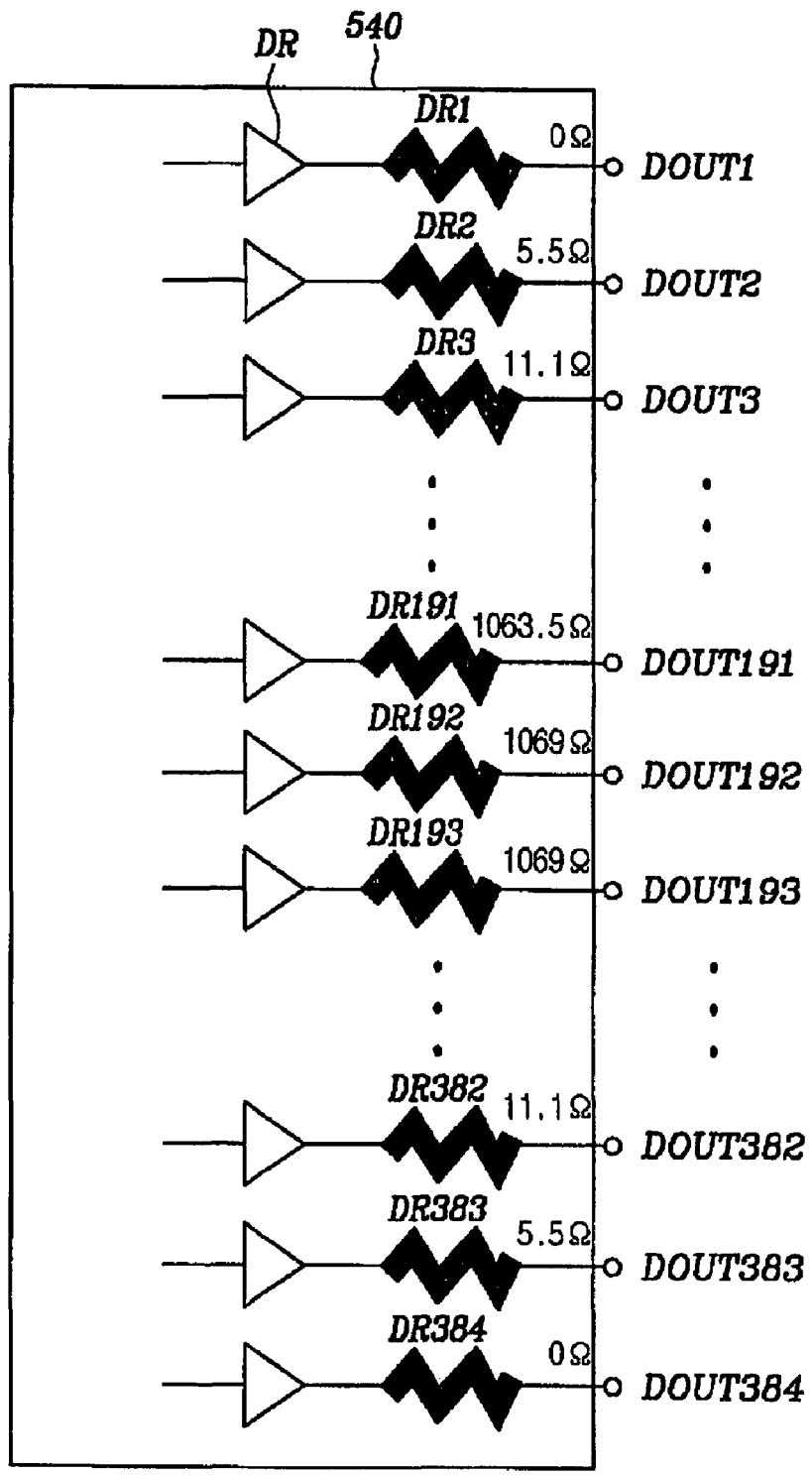
FIG. 6 is a circuit diagram schematically showing a data driving IC of an LCD according to an embodiment of the present invention.
Figure 7:
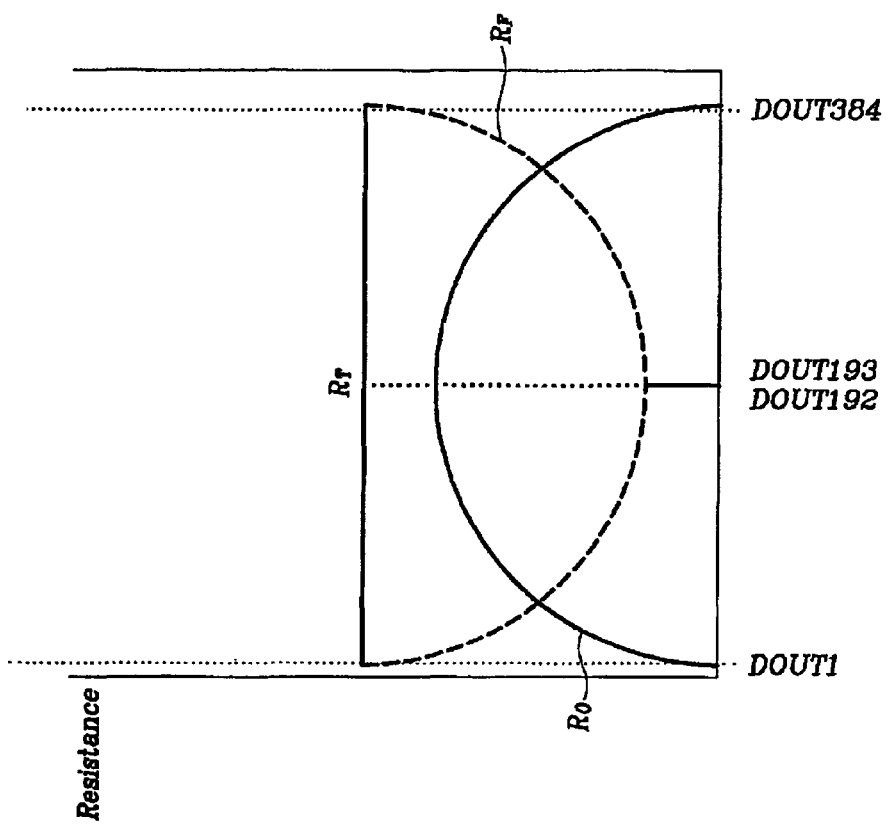
FIG. 7 is a graph showing the resistance of output terminals of the data driving IC shown in FIG. 5 and the resistance of gate lines in a fan-out area of an LCD including the data driving IC shown in FIG. 5.

FIGS. 4 and 6 are circuit diagrams schematically showing a gate driving IC and a data driving IC of an LCD according to embodiments of the present invention, respectively, FIG. 5 is a graph showing the resistance of output terminals of the gate driving IC shown in FIG. 4 and the resistance of gate lines in a fan-out area of an LCD including the gate driving IC shown in FIG. 4, and FIG. 7 is a graph showing the resistance of output terminals of the data driving IC shown in FIG. 5 and the resistance of gate lines in a fan-out area of an LCD including the data driving IC shown in FIG. 5;

A gate driving IC 440 receives a gate-on voltage and a gate-off voltage for turning on and off TFTs Q connected to gate lines 121 from an external device, and sequentially applies them to the gate lines 121 by a predetermined period. A data driving IC 540 converts input digital image data into analog data voltages and applies the data voltages to data lines 171. Referring to FIG. 3, the voltages applied to the data lines 171 are transmitted to a pixel electrode 190 via the activated TFT Q, and the voltage difference between the pixel electrode 190 and a common electrode 270 generates an electric field in a liquid crystal layer 3. The generated electric field determines the orientations of liquid crystal molecules, which in turn determine the polarization of incident light and thus the transmittance of the light.

The gate driving IC 440 and the data driving IC 540 temporarily store the voltages in buffers GB and DB before applying the voltages to the gate lines 121 and the data lines 171, respectively.

Referring to FIG. 4, the gate driving IC 440 includes a plurality of, for example, 256 output terminals GOUT1-GOUT256 arranged in a line. A plurality of resistors GR1-GR256 are connected between the buffer GB and the output terminals GOUT1-GOUT256. The outermost resistors GR1 and GR256 have the smallest resistance such as zero, the resistance of the resistors GR1-GR256 increases as it goes to the center, and the resistors GR128 and GR129 have the largest resistance such as 332 Ω.

Referring to FIG. 6, the data driving IC 540 includes a plurality of, for example, 384 output terminals DOUT1-DOUT384 arranged in a line. A plurality of resistors DR1-DR384 are connected between the buffer DB and the output terminals DOUT1-DOUT384. The outermost resistors DR1 and DR384 have the smallest resistance such as zero, the resistance of the resistors DR1-DR384 increases as it goes to the center, and the resistors DR192 and DR193 have the largest resistance such as 1069 Ω.

The resistance of each resistor GR1-GR256 or DR1-DR384 is determined depending on the resistance of the gate line 121 or the data line 171 to be connected thereto, in particular, in the fan-out area F. For example, the resistance $R_0$ of the resistors GR1-GR256 and DR1-DR384 is determined such that the total resistance $R_T$, which is defined as the sum of the resistance $R_0$ of a resistor GR1-GR256 or DR1-DR384 and the resistance $R_F$ of the signal lines 121 or 171 connected thereto in the fan-out area F, is uniform.

Furthermore, the shapes of signal lines in a fan-out area are deformed for compensating the resistance difference as well as the provision of the resistors. It is described in detail with reference to FIG. 8.

Figure 8:
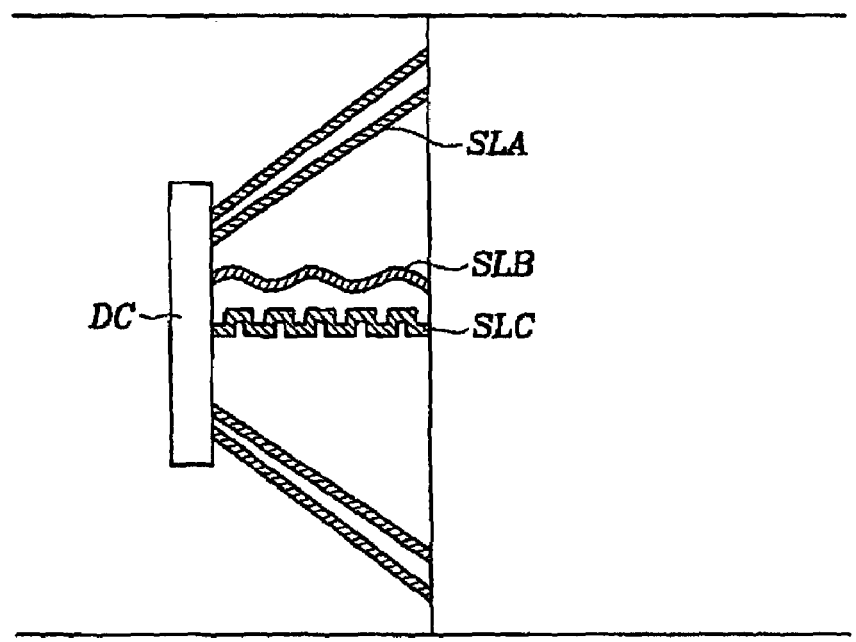
FIG. 8 is a layout view of a fan-out area of an LCD according to an embodiment of the present invention.

FIG. 8 is a layout view of a fan-out area of an LCD according to an embodiment of the present invention.

As shown in FIG. 8, signal lines SLA, SLB and SLC have various shapes including a straight line for reducing the length difference in a fan-out area. In particular, the short signal lines SLB and SLC near the center are curved to increase their lengths, thereby increasing their resistances. The curve of the signal line SLB is sinusoidal while the curve of the signal line SLC is rectangular. However, the shapes of the curves are not limited to those shown in FIG. 8.

The sum of the resistance of the output resistors of the driver IC 440 and 540 and the resistance of the signal lines connected thereto in the fan-out area can be further uniform by providing the configuration shown in FIG. 8.

Figure 9:
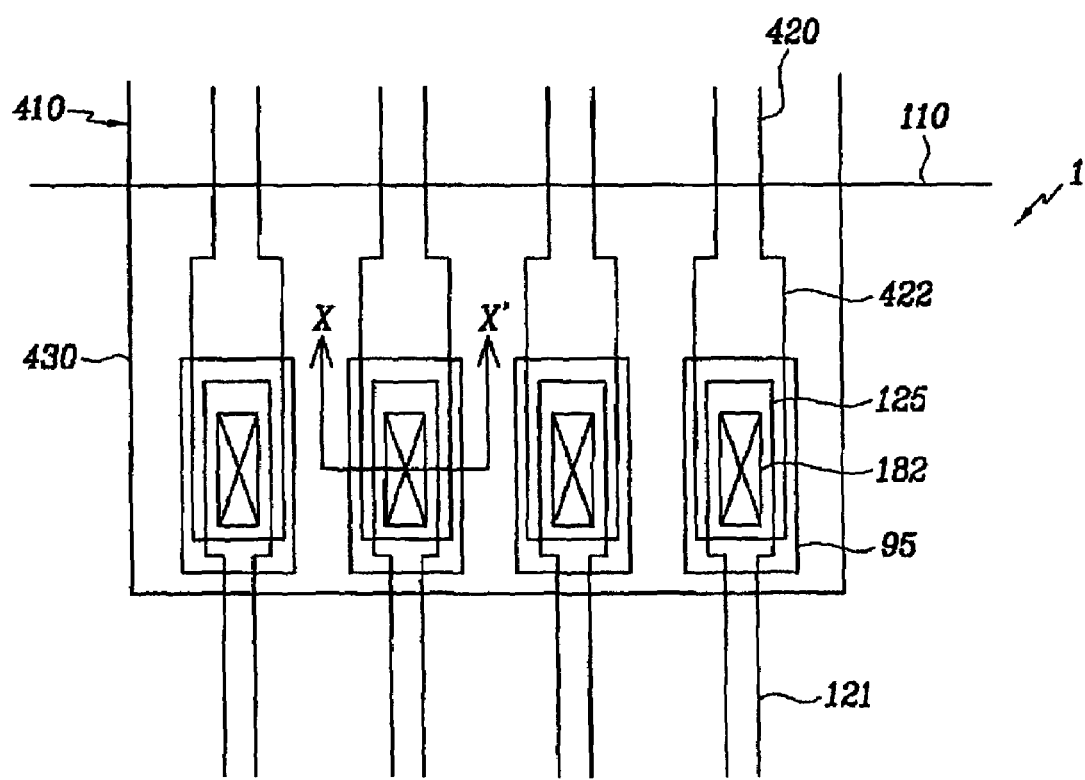
FIG. 9 is a layout view of a pad area of an LCD according to an embodiment of the present invention.
Figure 10:
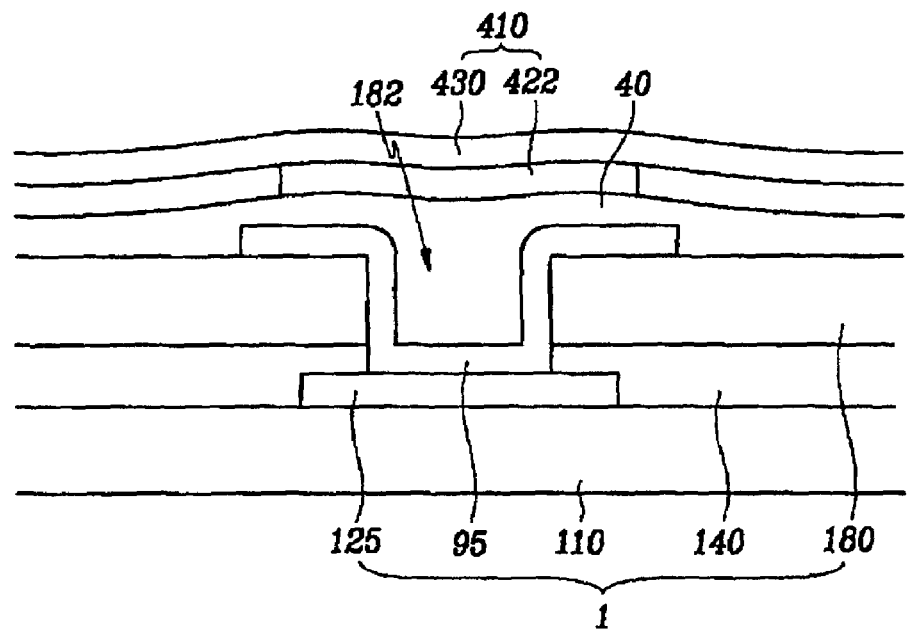
FIG. 10 is a sectional view of a gate pad area of an LCD according to an embodiment of the present invention taken along the line X-X' shown in FIG. 8.
Figure 11:
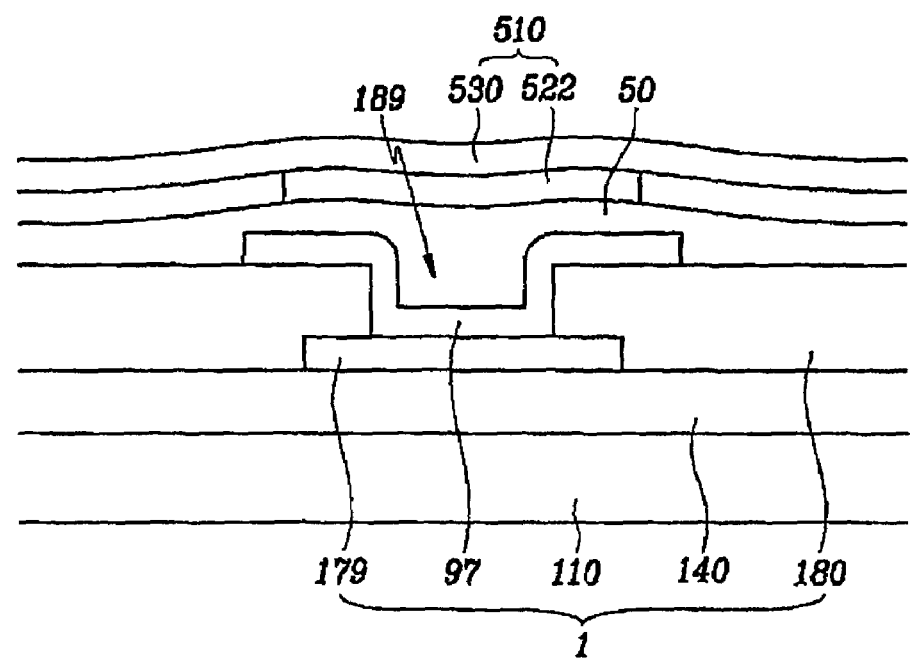
FIG. 11 is a sectional view of a data pad area of an LCD according to an embodiment of the present invention taken along the line X-X' shown in FIG. 8.

FIG. 9 is a layout view of a pad area of an LCD according to an embodiment of the present invention, and FIGS. 10 and 11 are sectional views of a gate pad area and a data pad area of an LCD according to embodiments of the present invention, respectively, taken along the line X-X' shown in FIG. 8.

Although the layout shown in FIG. 9 is common to the gate pad area and the data pad area, the reference numerals shown in FIG. 9 are those for the gate pad area for descriptive purposes. Reference numerals 171, 179, 97, 189, 510, 522 and 530 shown in FIG. 11 correspond to reference numerals 121, 125, 95, 182, 410, 422 and 430 shown in FIG. 9, respectively.

As shown in FIGS. 9-11, a plurality of gate lines 121 are formed on an insulating substrate 110 and an end portion 125 of each gate line 121 is expanded for connection with another device. A gate insulating layer 140 is formed on the gate lines 121, and a plurality of data lines 171 including expansions 179 for electrical connection with another device are formed on the gate insulating layer 140. A passivation layer 180 is formed on the data lines 171 and the gate insulating layer 140. The passivation layer 180 has a plurality of contact holes 189 exposing the expansions 179 of the data lines 171. The passivation layer 180 and the gate insulating layer 140 have a plurality of contact holes 182 exposing the end portions 125 of the gate lines 121. A plurality of contact assistants 95 and 97 are formed on the passivation layer 180. The contact assistants 95 and 97 are connected to the end portions 125 of the gate lines 121 via the contact holes 182 and to the expansions 179 of the data lines 171 via the contact holes 189, respectively.

Each FPC film 410 or 510 includes a film 430 and a plurality of leads 420 or 520 formed thereon. An end portion 422 or 522 of each lead 420 or 520 is expanded for electrical connection with another device.

An anisotropic conductive film 40 or 50 is formed between the panel 1 and the FPC film 410 or 510. The anisotropic conductive film 40 or 50 electrically connects the contact assistants 95 or 97 and the end portions 422 or 522 of the leads 420 or 520.

As described above, the embodiments of the present invention provide resistors at output terminals of driving ICs for reducing the resistance difference due to the length difference in a fan-out area, thereby effectively removing image deterioration due to the resistance difference.

Although the embodiments focus on LCDs, the present invention is also applicable to any display devices having fan-out areas.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A display device comprising:
   a plurality of signal lines, at least some of the signal lines having different lengths than other signal lines, each signal line including a connecting portion; and
   a driving integrated circuit for supplying signals to the signal lines, the driving integrated circuit including a plurality of output terminals arranged in a line, said output terminals being electrically coupled to the connecting portions of the signal lines, and a plurality of resistors coupled to the output terminals,
   wherein the resistors coupled to the output terminals near the center of the line have a greater resistance than the resistors coupled to the output terminals at the ends of the line and each of the plurality of resistors has a resistance depending on a length of a signal line coupled thereto.

2. The display device of claim 1, wherein the resistance of the resistors coupled to relatively long signal lines is less than the resistance of resistors coupled to relatively short signal lines.

3. The display device of claim 1, wherein a sum of the resistance of each resistor and the resistance of the signal line coupled thereto is substantially uniform.

4. The display device of claim 2, wherein the signal lines are arranged like a fan near the connecting portions.

5. The display device of claim 4, wherein the resistance of the resistors closer to edges of the driving circuit is smaller than the resistance of the resistors farther from the edges of the driving circuit.

6. The display device of claim 4, wherein at least one of the signal lines has curves near the connecting portions.

7. The display device of claim 1, wherein the driving circuit is chip-mounted on the display device.

8. The display device of claim 7, further comprising a printed circuit mounting the driving circuit and including a plurality of conductive lines for electrical connection between the driving circuit and an external device, the conductive lines coupled to the connecting portions of the signal lines.

9. The display device of claim 1, wherein the driving circuit further comprises a buffer for temporarily storing output voltages, and the resistors are coupled between the buffer and the output terminals.

10. The display device of claim 1, further comprising a package, wherein the driving integrated circuit is contained in the package and the plurality of signal lines are external to the package.

11. A liquid crystal display comprising:
   a plurality of gate lines for transmitting first signals, each gate line including a connecting portion;
   a plurality of data lines for transmitting second signals, each data line including a connecting portion;
   a plurality of switching elements coupled to the gate lines and the data lines and selectively transmitting the second signals in response to the first signals;
   a gate driving integrated circuit for supplying the first signals to the gate lines and including a plurality of output terminals arranged in a line, said output terminals being coupled to the connecting portions of the gate lines; and
   a data driving integrated circuit for supplying the second signals to the data lines and including a plurality of output terminals arranged in a line, said output terminals being coupled to the connecting portions of the data lines,
   wherein at least one of the gate driving integrated circuit and the data driving integrated circuit includes a plurality of resistors coupled to the output terminals thereof, and the resistors coupled to the output terminals near the center of the line have a greater resistance than the resistors coupled to the output terminals at the ends of the line and the resistance of each of the plurality of resistors depends on a length of a gate line or data line coupled thereto.

12. The liquid crystal display of claim 11, wherein the resistance of the resistors coupled to relatively long gate lines or data lines is relatively small.

13. The liquid crystal display of claim 11, wherein a sum of the resistance of each resistor and the resistance of the gate line or the data line coupled thereto is substantially uniform.

14. The liquid crystal display of claim 11, further comprising:
   a plurality of contact assistants contacting the connecting portions of the gate lines or the data lines; and
   a printed circuit including a film mounting the at least one of the gate driving circuit and the data driving circuit and a plurality of leads coupled to the output terminals of the at least one of the gate driving circuit and the data driving circuit,
   wherein the contact assistants contact the leads.

15. The display device of claim 11, wherein at least one of the gate lines or the data lines has curves near the connecting portions.

16. The liquid crystal display of claim 11, further comprising a package, wherein the at least one of the gate driving integrated circuit and the data driving integrated circuit including the plurality of resistors is contained in the package, and the plurality of signal lines are external to the package.

17. A driving integrated circuit for a liquid crystal display, the driving integrated circuit comprising:

a circuit element for generating driving signals;

a plurality of output terminals arranged in a line, said output terminals being electrically coupled to the circuit element and outputting the driving signals to signal lines; and a plurality of resistors coupled between the circuit element and the output terminals, wherein the resistors coupled to the output terminals near the center of the line have a greater resistance than the resistors coupled to the output terminals at the ends of the line and the resistance of the resistors increases or decreases depending on the output terminals coupled thereto.

18. The driving integrated circuit of claim 17, wherein the resistance of the resistors closer to a center of the driving integrated circuit is larger than the resistance of the resistors farther from the center of the driving integrated circuit.

19. The driving integrated circuit of claim 17, wherein a sum of the resistance of each resistor and the resistance of the signal line coupled thereto is substantially uniform.

* * * * *